Patented Mar. 10, 1942

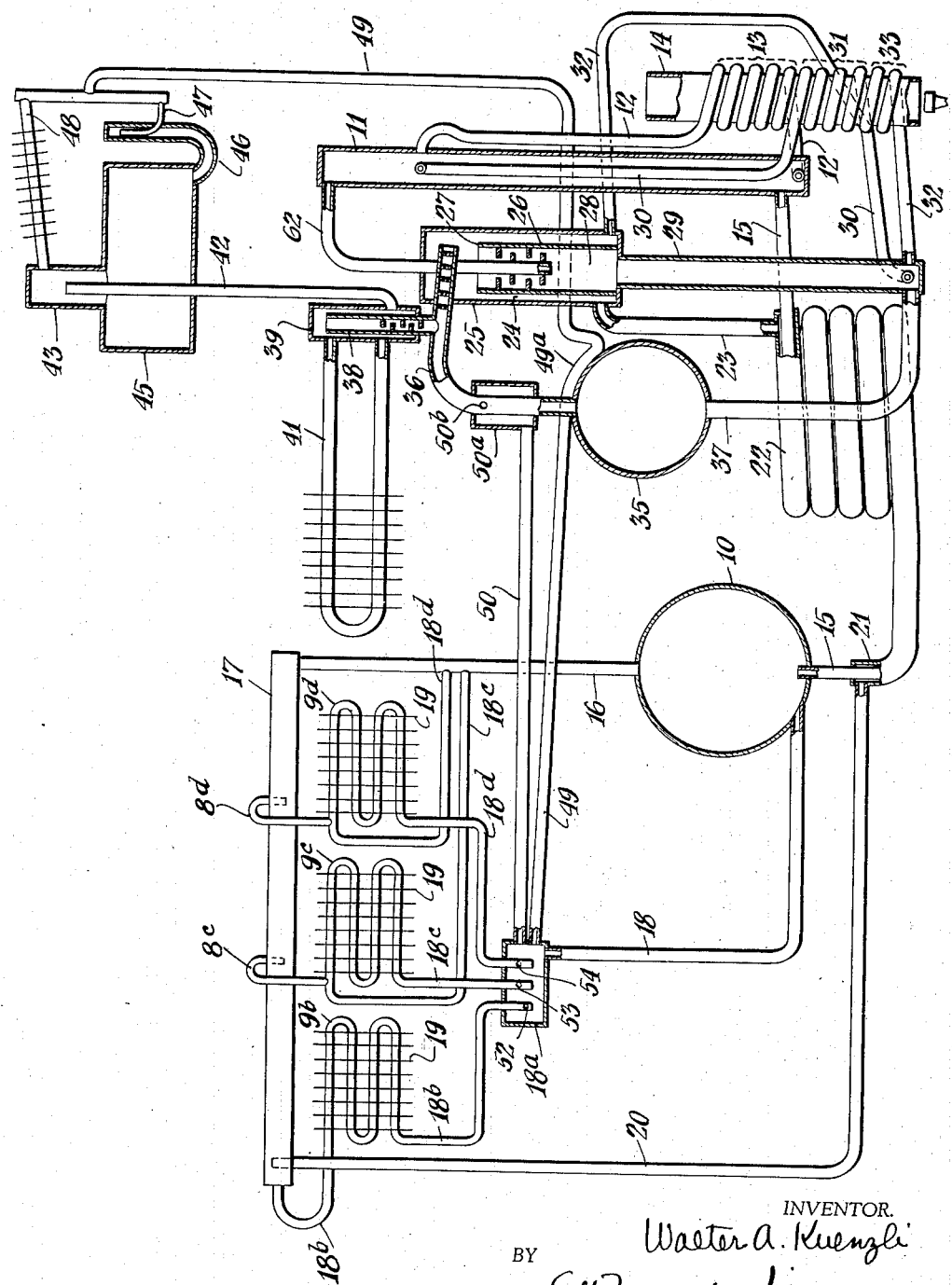

2,275,677

UNITED STATES PATENT OFFICE 2,275,677

REFRIGERATION

Walter A. Kuenzli, Evansville, Ind., assignor to Servel, Inc., New York, N. Y., a corporation of Delaware Application December 22, 1937, Serial No. 181,121

11 Claims. (Cl. 62—5)

My invention relates to refrigeration and more particularly to refrigeration systems of an absorption type.

It is an object of the invention to provide an improvement in systems of this type for increasing the surface contact between a gas and liquid. I accomplish this by providing a plurality of gas or vapor-lift lines in a liquid circulation circuit whereby liquid is repeatedly segregated by vapor and slugs of liquid are raised in the several lines by vapor-lift action. By this arrangement, the volume of liquid circulated is divided or split in the several vapor-lift lines and the gas and liquid contact is increased over that obtained in a single line or conduit. Further, the gas and liquid contact between the slugs of liquid and interlocked vapor is maintained for a considerable distance of the flow of the fluids in the several lines.

The invention, together with the above and other objects and advantages thereof, will be better understood from the following description and accompanying drawing forming a part of this specification, and of which the single figure more or less diagrammatically illustrates an absorption refrigeration system embodying the invention.

In the drawing I have shown the invention applied to a refrigeration system of the character generally described in Munters Patent No. 2,086,632, but it should be understood that the invention is not limited to the refrigeration system therein described. However, for purposes of description, it may be considered that the disclosure of Munters Patent No. 2,086,632 is incorporated in this application.

The system shown in Fig. 1 includes an absorption liquid reservoir 10 which is of sufficient volume to hold the bulk of the absorption liquid in the system. This reservoir is preferably exposed to the cooling influence of surrounding air. To one side of reservoir 10 is a vessel 11 which may be termed a generator or separator or be considered as a part of a vapor expeller. This vessel is not directly heated, though it may be. In the embodiment illustrated, the contents of vessel 11 are heated by a conduit 12 including a vapor-lift coil 13 which is in heat exchange relation with a flue 14 which may be suitably heated as by a gas burner or by an electric heater disposed therein.

Between vessels 10 and 11 is a liquid heat exchanger 22 including inner and outer conduits forming heat exchange spaces for flow of liquid. The inner conduit 15 of the heat exchanger is connected at one end to the lower part of vessel 11, and at its other end to the reservoir 10. Conduit 15 provides a path for flow of liquid from the bottom part of vessel 11 to reservoir 10.

Connected to the top of reservoir 10 is a vertical conduit 16, the upper end of which is connected to a vessel 17 which is normally filled or substantially filled with liquid. To the lower part of reservoir 10 is connected a vertically extending conduit 18 which communicates at its upper end with a chamber 18a. A plurality of lines 18b, 18c, and 18d extend upwardly from chamber 18a. These lines include horizontal looped portions 9b, 9c, and 9d constituting absorption liquid cooling elements having fins 19 for increasing the heat transfer surface. The upper end of vapor-lift line 18b is connected to vessel 17. From the upper ends of cooling elements 9c and 9d the lines 18c and 18d extend downwardly and are connected to conduit 16. To the upper parts of cooling elements 9c and 9d are connected conduits 8c and 8d which extend upwardly and into vessel 17.

A strong liquor conduit 20 is also connected to vessel 17. The parts 16, 17, 18, 18a, 18b, 18c, 18d, and 20 constitute an absorption liquid containing structure extending above reservoir 10. This structure is connected to the liquid space of the absorption liquid containing part of the system so that, practically at all times, this structure is filled or substantially filled with liquid due to the fact that, these parts being exposed to atmosphere, the temperature of the fluid therein is such that for the pressure prevailing in the system and in view of the concentration of solution, all the gas can be dissolved and remain in solution form.

The lower end of conduit 20 is connected to the outer conduit 21 of the liquid heat exchanger 22. A conduit 23 extends between the other end of the outer conduit of the heat exchanger and the lower part of an annular chamber 24 which is formed between vessel 25 and an inner vertically disposed cylinder 26. Chamber 24 is closed at the bottom except for conduit connections and is open at the top. The upper edge 27 of inner cylinder 26 provides an overflow edge. The central space 28 is connected at the bottom with a tube 29. This tube contains a liquid reaction head for a gas-lift structure.

A conduit 32 is connected to the bottom of tube 29 and includes a gas-lift coil 33 surrounding flue 14. The upper end of coil 33 is connected by the conduit 32 to the space 24. A second conduit 30 is connected to the lower end of tube 29 and includes a gas-lift coil 31, the upper end of which extends within the upper part of vessel 11. A vapor conduit 62 connects the upper part of vessel 11 with the space 28.

A volume variation vessel 35 is connected by conduits 37 and 36 with the tube 29 and the vessel 25.

A conduit 38 extends upwardly from conduit 36 and projects within a rectifier jacket 39 to which is connected a condenser loop 41 having fins thereon exposed to atmospheric air for cooling. The rectifier 39 is connected by means of a conduit 42 with an evaporator 45 which is adapted to be located within a space to be cooled.

Connected to the evaporator 45 is a conduit 46 adapted to receive residue absorption liquid from the bottom of the evaporator. A loop 47 has an opening within conduit 46 and is connected at a high point to dome 43 of the evaporator by means of a conduit 48. Conduit 48 may be provided with cooling fins to provide an auxiliary condenser. Connected to loop 47 is an overflow tube 49 which has a part 49a in heat exchange relation with the volume variation vessel 35 and which is connected to chamber 18a. A pipe 50 is connected at one end to chamber 18a at a point above the connection of conduit 49, and at the other end to a chamber 50a through which the conduit 36 extends. The conduit 36 is provided with an opening 50b whereby gas from the evaporator can enter chamber 50a.

The operation of the system described above is set forth at length in the aforementioned Munters patent and will be here briefly described, reference being had to the aforesaid patent for a more detailed description of operation, if desired.

During a high pressure period heat is applied in the flue 14. This causes generation of vapor in the three gas-lift coils 13, 31, and 33. Coil 13 is merely a local circulator for the generator vessel 11. Coil 31 causes a lifting of liquid and vapor from the bottom of tube 29 to the upper part of vessel 11. In vessel 11 the vapor generated is separated from the liquid. The liquid flows downwardly within vessel 11 and through conduit 15 to the reservoir 10. From reservoir 10 liquid circulates upwardly through conduit 16, through vessel 17, through conduit 20, through conduit 21 forming the outer space of heat exchange 22, and through conduit 23 and into space 24. Liquid in space 24 is pushed upwardly therein due to the lifting of liquid and vapor by coil 33 and the liquid overflows into space 28 and down into tube 29 whence the liquid is returned to the vessel 11 by means of coil 31.

The expelled vapor passes through conduit 62 and flows upwardly through the overflow liquid in vessel 25. The vapor thence flows upwardly through conduit 38 and is condensed in condenser loop 41. Entrained water vapor is removed from the refrigerant vapor in the analyzer space 28 and the rectifier 39 and returns to the lower part of the system. Liquid refrigerant is forced through conduit 42 into the evaporator 45 where it collects. During this period there is little or no circulation through conduit 8, chamber 18a, and lines 18b, 18c, and 18d. The expulsion of refrigerant vapor continues until the evaporator contains so much liquid refrigerant that there is an overflow through conduit 46 and loop 47 into conduit 49. Liquid overflowing through conduit 49 consists at first of absorption liquid. This liquid flows in heat exchange relation with the volume variation vessel 35 at 49a but the absorption liquid is not vaporized. When, however, substantially pure refrigerant overflows through conduit 49 it becomes vaporized at point 49a. The introduction of vapor from conduit 49 into chamber 18a causes a circulation to be set up, as will be described hereinafter, which circulation of warm liquid may be utilized by means of a thermostat or through other means to shut off the heat to the generator, thereby closing the generating period.

When the heat to the generator is shut off, the liquid in space 24 drops since the coil 33 is no longer effective, and as this liquid drops a corresponding lowering of liquid takes place in chamber 50a, whereupon gas has free entry into chamber 18a from the evaporator through conduits 42, 38, and 36, opening 50b, chamber 50a, and conduit 50. Now an absorption period starts, which period is at reduced pressure. The gas rises in two or more of the lines 18b, 18c, and 18d, as described hereinafter, and is absorbed in two or more of the absorber cooling elements 9b, 9c, and 9d. During this absorption period a circulation is set up from reservoir 10 through conduit 18, chamber 18a, and two or more lines 18b, 18c, and 18d. The absorption liquid in line 18b flows into vessel 17 and thence downwardly through conduit 16 into reservoir 10. The absorption liquid in lines 18c and 18d flows therefrom into conduit 16.

The lower ends of lines 18b, 18c, and 18d which extend into chamber 18a are provided with openings 52, 53, and 54, respectively. The openings 53 and 54 in lines 18c and 18d are substantially at the same level and opening 52 in line 18b is at a lower level.

When substantially pure refrigerant overflows through conduit 49 and becomes vaporized at 49a, as explained above, the vapor is introduced in chamber 18a. This vapor depresses the liquid level in chamber 18a and the liquid in the upper part of the chamber is repeatedly segregated in a well-known manner by the vapor whereby slugs of liquid are raised in the vapor-lift lines by vapor-lift action. The internal diameter of lines 18b, 18c, and 18d is sufficiently small so that vapor bubbles cannot freely pass liquid in these lines. Since the openings 53 and 54 are at a higher level than opening 52, slugs of liquid are raised first in lines 18c and 18d. If the quantity of vapor introduced through conduit 49 is such that the liquid level in chamber 18a remains above opening 52 in line 18b, liquid circulation is only set up in lines 18c and 18d. The circulation of warm liquid in these lines may be utilized to shut off the heat to the generator, as explained above. When the quantity of vapor entering through conduit 49 is such that the liquid level in chamber 18a falls to the opening 52, liquid is raised by vapor-lift action in line 18b, as well as in lines 18c and 18d.

After the heat to the generator is shut off and the absorption period starts, the liquid level in chamber 50a lowers and vapor from the evaporator 45 flows into chamber 18a. Since the openings 53 and 54 are at a higher level than opening 52, the vapor-lift lines 18c and 18d will begin to function. Thus, for a low or medium rate of evaporation of refrigerant in evaporator 45, lines 18c and 18d will carry the entire load and line 18b will not function at all.

The slugs of liquid and vapor rise in lines 18c and 18d and flow through the absorber cooling elements 9c and 9d. Since the liquid flowing upward in conduit 18 is split or divided in chamber 18a into the lines 18c and 18d, the gas and liquid contact between the warm liquid and vapor is increased considerably. The vapor is absorbed in the liquid while flowing through the absorber cooling elements 9c and 9d, and, due to the rapid flow of the fluids through the cooling elements by vapor-lift action, the heat of absorption is effectively transmitted from the solution to the surrounding air.

The absorption solution flows from the upper ends of cooling elements 9c and 9d through the lines 18c and 18d into conduit 16, and then flows downward in the latter into the upper part of reservoir 10. Any vapor passing through the cooling elements 9c and 9d will flow through conduits 8c and 8d into vessel 17 where it will be practically immediately absorbed into solution in the liquid therein. While the upper ends of the vent conduits 8c and 8d may terminate in the upper part of vessel 17 and above the liquid level therein, these conduits preferably extend downward below the liquid level to facilitate the absorption of refrigerant vapor.

When the rate of evaporation of refrigerant in evaporator 45 increases and the lines 18c and 18d become overloaded, the line 18b comes into action. This occurs when rate of flow of refrigerant vapor into chamber 18a is such that the liquid level therein is depressed to opening 52, whereupon liquid is raised by vapor-lift action in all of the lines 18b, 18c, and 18d. Vapor in line 18b is absorbed in liquid during the flow of the fluids through absorber cooling element 9b, and the solution flows into vessel 17. From vessel 17 liquid flows downward in conduit 16 to reservoir 10 along with the liquid flowing downward from the upper ends of absorber cooling elements 9c and 9d.

The above described arrangement of effecting gas and liquid contact is particularly advantageous in relatively large systems in which a relatively large quantity of refrigerant vapor is absorbed per unit of time. In systems of this character it is desirable to circulate large volumes of absorption solution in order to keep the concentration of the solution low, particularly in the absorber. By providing multiple gas or vapor-lift lines in a system of the character described, a rapid circulation of liquid is easily effected whereby a rich solution of refrigerant and absorption liquid is avoided in the absorber during the first part of an absorption period. The rapid circulation of liquid is desirable because the transmission of the heat of absorption from the solution is facilitated due to the motion of the fluids in the cooling elements.

In the preferred embodiment shown in the drawing the particular arrangement of the multiple gas or vapor-lift lines is such that the forming of a vapor space in vessel 17 is retarded. When lines 18c and 18d carry the entire load and line 18b is not functioning, any vapor that may flow through vent conduits 8c and 8d from the upper ends of cooling elements 9c and 9d is readily absorbed into solution in vessel 17 because the concentration of the solution is kept low in this vessel.

The lines 18b, 18c, and 18d become overloaded when more gas enters these lines than can be absorbed due to heat dissipation from cooling fins 19. This gas or vapor flows into vessel 17, and, when a sufficient quantity of excess vapor or gas accumulates in the vessel, the liquid level therein is depressed downward.

This lowering of the liquid level in vessel 17 acts to regulate the flow of refrigerant vapor from evaporator 45 into the liquid circulation circuit during an absorption period, as described in detail in the aforementioned Munters patent. In other words, the accumulation of excess vapor in vessel 17 and depressing of the liquid level therein acts to reduce the rate of flow of refrigerant vapor from evaporator 45 into the absorption liquid circuit. By providing the multiple vapor-lift lines, any vapor flowing into vessel 17 through conduits 18c and 18d is readily absorbed into solution when only lines 18c and 18d are in operation. Only when an over load occurs after all of the vapor-lift lines come into action does excess vapor begin to accumulate in vessel 17. With the arrangement described above, therefore, the forming of an excess vapor space in vessel 17 is retarded so that the flow of vapor into the liquid circulation circuit during an absorption period is not reduced until the rate of evaporation becomes relatively great and a reduced flow of vapor is desired.

It will be obvious to those skilled in the art that the invention is not limited to the specific refrigeration system disclosed.

What is claimed is:

1. In an absorption refrigeration system of the kind having low pressure periods of refrigerant evaporation and absorption alternating with higher pressure periods of expulsion of refrigerant from solution, a generator, an evaporator, and a storage reservoir of sufficient volume to hold the bulk of absorption liquid in the system, members forming a circuit for circulation of liquid through said reservoir including a plurality of upflow conduits, and means to conduct vapor from said evaporator to said conduits, said conduits splitting the flow of liquid and vapor so that relatively small quantities of liquid at a time from the reservoir are caused to flow in the presence of the vapor.

2. An absorption refrigeration system as set forth in claim 1, in which said upflow conduits are so constructed and arranged that flow of vapor takes place in a greater number of said conduits with increase in the rate of evaporation and flow of vapor from said evaporator.

3. An absorption refrigeration system as set forth in claim 1, in which said upflow conduits constitute absorbers having heat emitting parts.

4. In an absorption refrigeration system as set forth in claim 1, means to permit separation of vapor from liquid at the upper parts of said conduits.

5. An absorption refrigeration system including a vapor expulsion component, members forming an absorption liquid circuit having upflow conduits and a downflow conduit connected at their upper ends above said vapor expulsion component, said upflow conduits providing parallel paths of flow, means to so introduce gas into said upflow conduits that relatively small quantities of absorption liquid at a time are caused to flow in the presence of the gas, and means to control admission of gas while maintaining circulation of liquid in said circuit.

6. A refrigeration system of the kind having low pressure periods of refrigerant evaporation and absorption alternating with higher pressure periods of vapor expulsion and including a main circuit and an auxiliary circuit for circulation of absorption liquid in the latter of which there is substantially no circulation of absorption liquid during the higher pressure periods of vapor expulsion, and said auxiliary circuit being arranged to provide means for causing circulation of liquid therein during the low pressure periods by raising liquid in parallel paths of flow by vapor-lift action.

7. In an absorption refrigeration system having low pressure periods of refrigerant evaporation and absorption alternating with higher pressure periods of vapor expulsion, an absorption liquid reservoir, a vessel above said reservoir, an upflow conduit and a downflow conduit connecting said vessel and said reservoir to form a circulation circuit for absorption liquid, said upflow conduit providing parallel paths of flow for absorption liquid, means to admit gas to said circuit for upflow therein, the parallel paths of flow provided by said upflow conduit splitting the flow of absorption liquid and vapor so that relatively small quantities of liquid at a time from the reservoir are caused to flow in the presence of the gas, and means including a conduit connected to said vessel and extending below said vessel for variably controlling admission of gas to said circuit.

8. An absorption refrigeration system as set forth in claim 7 in which said means to admit gas to said circuit and said upflow conduit providing the parallel paths of flow are so constructed and arranged that gas flows in a greater number of the paths of flow with increase in the rate at which the gas is admitted to said circuit.

9. In an absorption refrigeration system having low pressure periods of refrigerant evaporation and absorption alternating with higher pressure periods of vapor expulsion, an absorption liquid circulation circuit including a reservoir, an upflow conduit providing parallel paths of flow for liquid and constituting an absorber, and a downflow conduit, an evaporator, means to conduct vapor from the evaporator to said upflow conduit, the parallel paths of flow provided by said upflow conduit splitting the flow of liquid and vapor so that relatively small quantities of liquid at a time from the reservoir are caused to flow in the presence of the vapor, and means including a vessel situated above said absorber and constructed and arranged to receive excess unabsorbed vapor from said absorber to displace liquid for regulating flow of vapor from said evaporator to the upflow conduit.

10. In an absorption refrigeration system, gas and liquid contact apparatus including a plurality of upflow lines connected in parallel, and structure including said upflow lines connected to receive gas and liquid whereby gas and liquid passes into each of said lines and flow of liquid is effected in said lines by vapor-lift action, said lines and said structure being so constructed and arranged that vapor will flow in a greater number of said lines with increase in the rate at which said structure receives gas.

11. In an absorption refrigeration system, apparatus for bringing gas and liquid fluids in the system into good contact including a chamber, a plurality of conduits extending upward from said chamber and having openings in said chamber, means for conducting gas and liquid fluids in the system to said chamber, and each of said conduits having at least one port in its side within said chamber and above said openings, the highest port in one conduit being below the highest port in another of said conduits.

WALTER A. KUENZLI.